United States Patent
Nakatomi et al.

(10) Patent No.: US 6,193,300 B1
(45) Date of Patent: Feb. 27, 2001

(54) OPENING AND CLOSING DEVICE FOR A TRUCK LID OF A VEHICLE

(75) Inventors: Noriaki Nakatomi, Toyoto; Kenichiro Hayashi, Okazaki; Fumiho Nishi, Chiryu, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/408,272

(22) Filed: Sep. 29, 1999

(30) Foreign Application Priority Data

Sep. 29, 1998 (JP) .................................. 10-275476

(51) Int. Cl.⁷ ........................................................ B60J 7/20
(52) U.S. Cl. ........................ 296/107.08; 296/76; 296/136
(58) Field of Search ................................. 296/76, 107.08, 296/136; 49/192, 193

(56) References Cited

U.S. PATENT DOCUMENTS 5,558,389 * 9/1996 Rothe et al. ..................... 296/136 X
5,823,606 * 10/1998 Schenk et al. .................. 296/107.08
6,010,178 * 9/1996 Hahn et al. ..................... 296/107.08

FOREIGN PATENT DOCUMENTS 8-230484   9/1996 (JP) .

* cited by examiner

Primary Examiner—D. Glenn Dayoan
Assistant Examiner—Jason Morrow
(74) Attorney, Agent, or Firm—Burns, Doane, Swecker & Mathis, LLP

(57) ABSTRACT

An opening and closing device for a trunk lid of a vehicle includes a link mechanism mounted between the trunk lid and a vehicle body such that both the front side and the rear side of the trunk lid can be opened. A first connecting portion of the link mechanism is connected with the trunk lid and has a rear side connecting portion pivotably connected to the trunk lid and a front side connecting portion pivotally and detachably connected to the trunk lid. A second connecting portion of the link mechanism is connected with the vehicle body and has a rear side connecting portion pivotably connected to the vehicle body and a front side connecting portion pivotably and movably connected to the vehicle body. A hinge mechanism is mounted between the rear side of the trunk lid and the vehicle body such that the rear side of the trunk lid can be pivotally and detachably connected to the vehicle body.

17 Claims, 11 Drawing Sheets

US 6,193,300 B1

OPENING AND CLOSING DEVICE FOR A TRUCK LID OF A VEHICLE

This application is based on and claims priority under 35 U.S.C. § 119 with respect to Japanese Application No. 10(1998)-275476 filed on Sep. 29, 1998, the entire content of which is incorporated herein by reference.

FIELD OF THE INVENTION

The present invention generally relates to an opening and closing device for a vehicle. More particularly, the present invention pertains to an opening and closing device for a convertible vehicle for storing the roof portion and rear window portion.

BACKGROUND OF THE INVENTION

Japanese Patent Laid-Open No. 230484/1996 discloses an example of a convertible top vehicle that is designed to store the roof portion and the rear window portion of the vehicle in the rear portion of the vehicle. The construction of this convertible top vehicle is generally shown in FIG. 9 which illustrates a vehicle 100 provided with a roof structure portion 104 having a roof portion 101 and a rear window portion 102. The roof structure portion 104 is brought into contact with and supported by a portion of a front face glass frame via a forced type control apparatus 106 that is fixedly supported by a vehicle body. The roof structure portion 104 is adapted to be pivoted toward the rear portion 110 of the vehicle 100 from a closed position covering a rear seat area 108 to an open position in which the rear seat area is uncovered. The roof structure portion 104 is also adapted to be stored in a roof storage box 116 located in the region of the rear portion of the vehicle and covered by a lid 114 that is supported via a first pivot shaft 112. The lid 114 is hinge-coupled to an auxiliary frame 118 by the first pivot shaft 112, and the auxiliary frame 118 is supported by the vehicle body side in a lower portion of the vehicle 122 via a second pivot shaft 130.

As shown by FIG. 10, the lid 114 can be moved to a rear side opened position in which the rear side is freely opened when the lid 114 is moved in a manner centered on the first pivot shaft 112. In addition, as shown in FIG. 9, the lid 114 can be pivoted to a front side opened position in which the front side is freely opened when the lid 114 is pivoted in a manner centered on the second pivot shaft 130.

In this type of opening and closing device, as shown in FIG. 11, the auxiliary frame 118 is formed by a U-shaped support piece 126 that includes a pair of support legs 120 and a base leg 132. The base leg 132 extends orthogonally to the vehicle longitudinal axis line 128 and forms the second pivot shaft 130 of the auxiliary frame 118 that is supported by the vehicle side via at least one hinge joint 134. The trunk lid 114 is coupled to the auxiliary frame 118 by way of the guide rods 123 at the first pivot shaft 112, and hydraulic cylinders 140 and gas charge springs 142 are coupled to the vehicle body via common supports 144. This opening and closing device thus requires a relatively large number of parts and is relatively heavy, and the cost associated with fabricating the device is increased.

In light of the foregoing, a need exists for a trunk lid opening and closing device that is not susceptible to the same disadvantages and drawbacks as other known devices.

SUMMARY OF THE INVENTION

According to one aspect of the present invention, an opening and closing device for a trunk lid of a vehicle includes a link mechanism mounted between the trunk lid and a vehicle body such that both the front side and the rear side of the trunk lid can be opened. A first connecting portion of the link mechanism is connected with the trunk lid and has a rear side connecting portion pivotably connected to the trunk lid and a front side connecting portion pivotally and detachably connected to the trunk lid. A second connecting portion of the link mechanism is connected with the vehicle body and has a rear side connecting portion pivotally connected to the vehicle body and a front side connecting portion pivotally and movably connected to the vehicle body. A hinge mechanism is mounted between the rear side of the trunk lid and the vehicle body such that the rear side of the trunk lid can be pivotally and detachably connected to the vehicle body.

According to another aspect of the invention, an opening and closing device mounted in a vehicle for opening and closing a trunk lid of the vehicle includes a link mechanism mounted between the trunk lid and the vehicle body to permit the trunk lid to be moved from a closed state to a front side open state in which a forward end of the trunk lid is lifted and between the closed state and a rear side open state in which a rear end of the trunk lid is lifted. The link mechanism is pivotally connected to the trunk lid at a pin. A releasable connection mechanism effects connecting engagement between a portion of the link mechanism and the trunk lid to prevent pivoting movement of the trunk lid relative to the portion of the link mechanism about the pin and for effecting release of the connecting engagement between the portion of the link mechanism and the trunk lid to permit pivoting movement of the trunk lid relative to the portion of the link mechanism about the pin.

In accordance with another aspect of the present invention, an opening and closing device mounted in a vehicle for opening and closing a trunk lid of the vehicle includes a link mechanism mounted between the trunk lid and a vehicle body which permits the trunk lid to be moved between a closed state and a front side open state in which a forward end of the trunk lid is lifted and between the closed state and a rear side open state in which a rear end of the trunk lid is lifted. The link mechanism is connected to the trunk lid at first and second spaced apart points. The device is also provided with a mechanism for releasing the connection between the link mechanism and the trunk lid at the second point when the trunk lid is moved between the closed state and the front side open state while maintaining the connection between the link mechanism and the trunk lid at the second point when the trunk lid is moved between the closed state and the rear side open state.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE PREFERRED EMBODIMENTS

Figure 1:
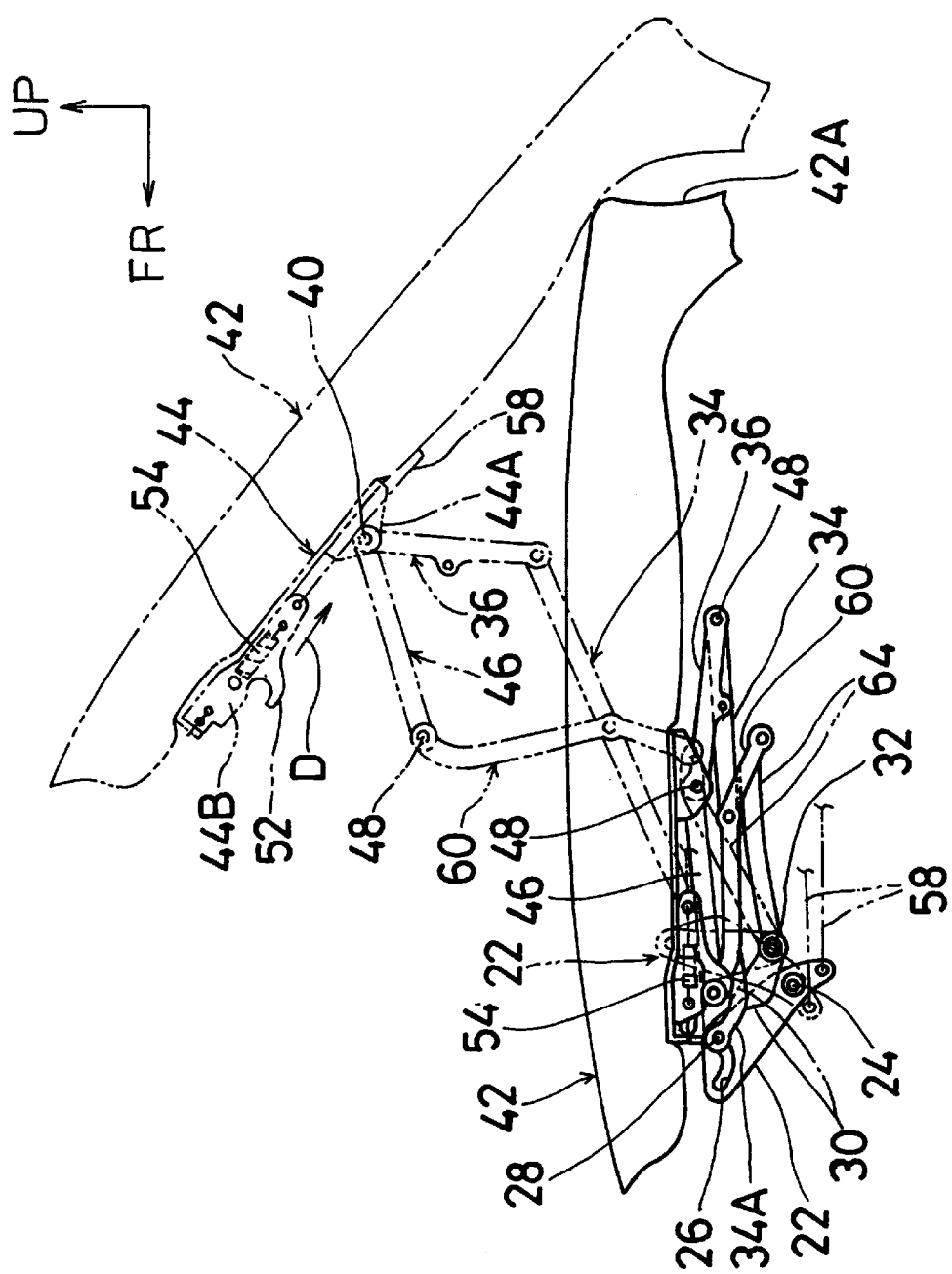
FIG. 1 is a side view of the trunk lid showing the opening and closing device according to an embodiment of the present invention in which the trunk lid is open towards the front side.

The following detailed description which follows makes reference to the upward direction and the forward or front direction. The arrows designated UP in the drawing figures refer to the upward direction of the vehicle and the arrows designated FR in the drawing figures refer to the forward or front direction of the vehicle.

Figure 2:
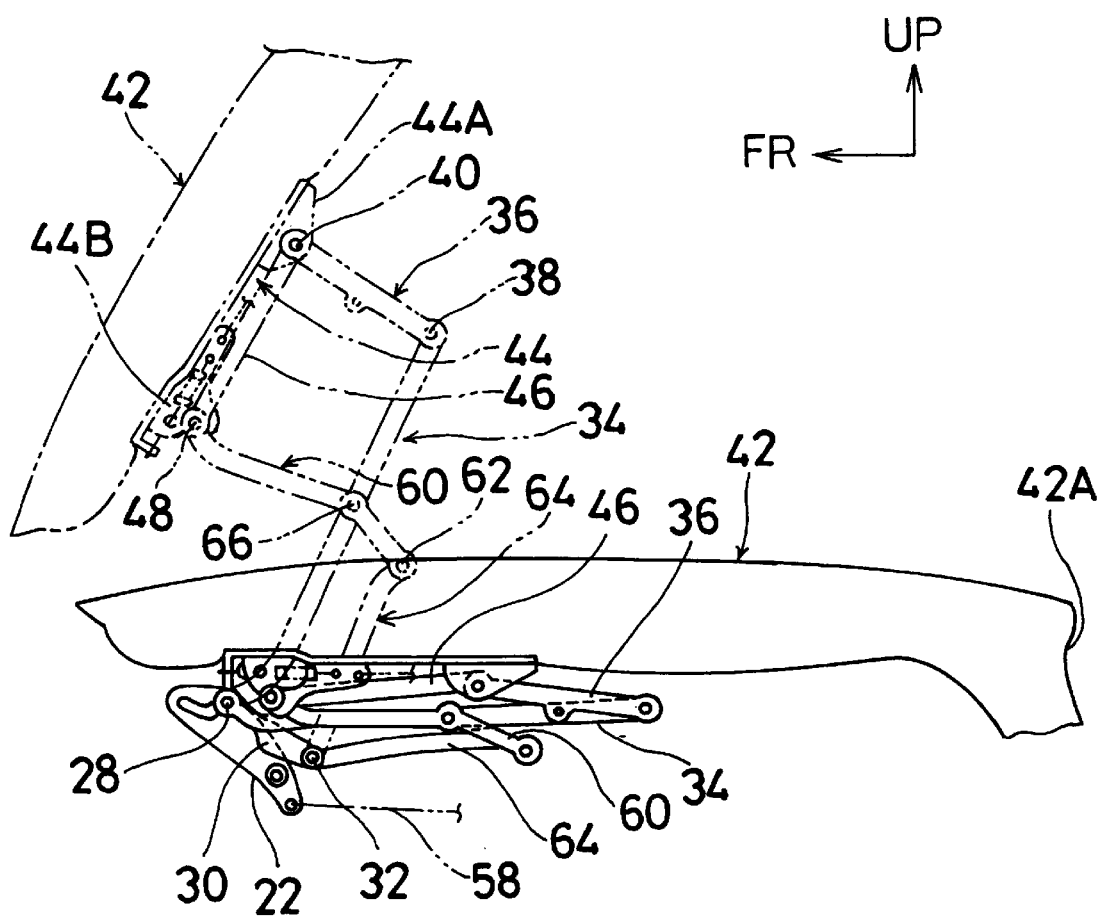
FIG. 2 is a side view similar to FIG. 1 but showing the trunk lid opening towards the rear side.
Figure 3:
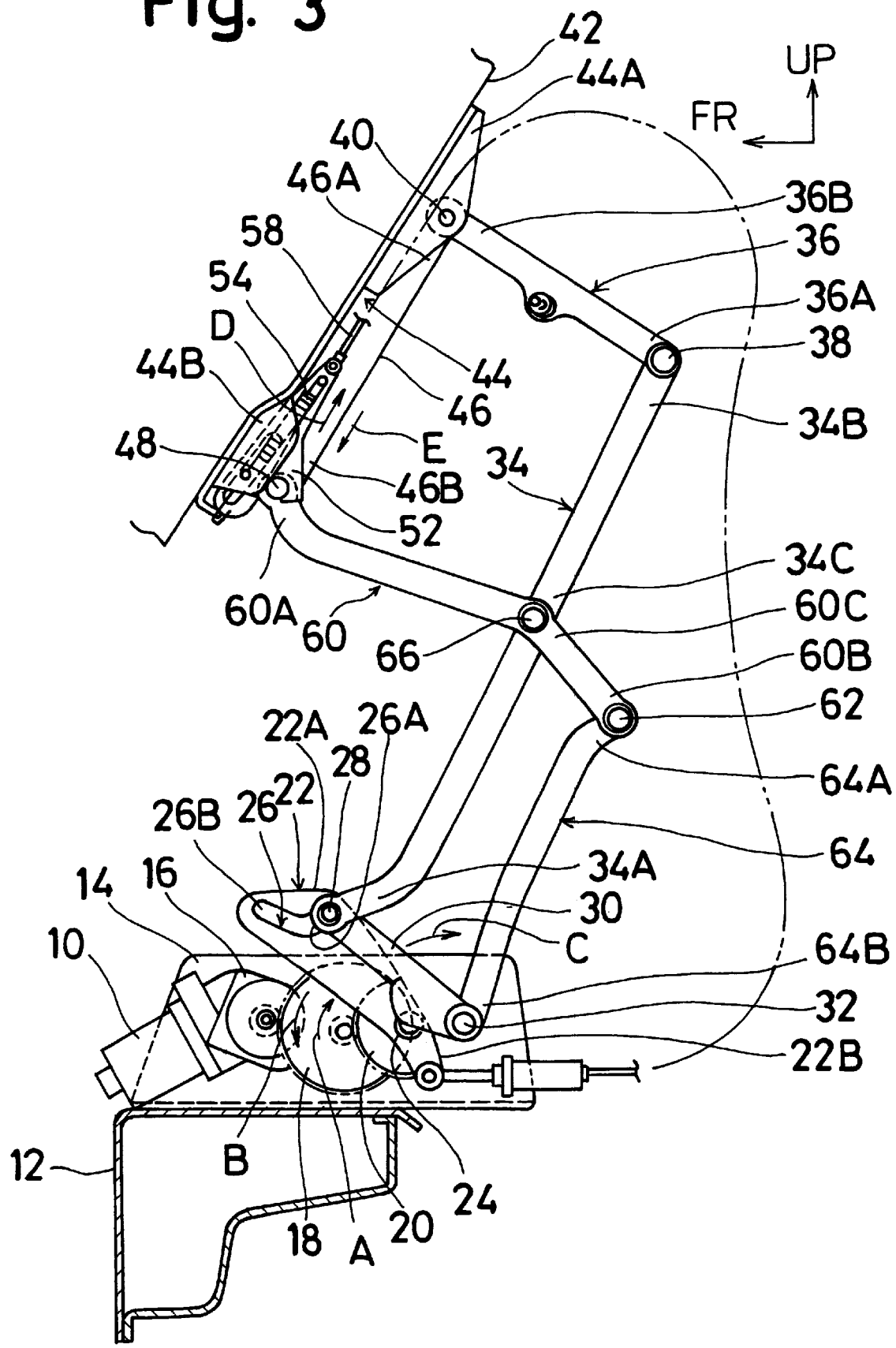
FIG. 3 is an enlarged side view showing the opening and closing device according to the present invention.

As shown initially with reference to FIG. 3, the opening and closing device includes a left side motor 10 constituting a driving mechanism. It is to be understood that another motor is positioned on the opposite side of the vehicle along with an arrangement of features similar to those shown in FIGS. 1–3. Thus, the following description of the features shown in FIGS. 1–3 and positioned on one side of the vehicle applied equally to the arrangement of features on the opposite side.

The motors 10 on opposite sides of the vehicle are fixed to respective end portions, considered with reference to the width-wise direction of the vehicle, of a crossing member 12 arranged along the vehicle width direction at the rear portion of the vehicle body via brackets 14. The output shaft of the motor 10 transmits a drive force to a drive gear 20 via a gear box 16 and a transmission gear 18.

The drive gear 20 is fixed to a cam 22 and the cam 22 is axially supported in a pivoting manner by a shaft 24 that is erected on the bracket 14. As a result of forward rotation of the motor 10, the cam 22 rotates in the clockwise direction (i.e., the direction indicated by the arrow A in FIG. 3) about a point centered on the shaft 24 from the stationary position shown in FIG. 3. Also, as a result of rearward rotation of the motor 10, the shaft 24 rotates in the counterclockwise direction in FIG. 3 (i.e., in the direction indicated by the arrow B in FIG. 3) and returns to the stationary position shown in FIG. 3.

A substantially L-shaped cam hole 26 is formed at the front portion 22A of the cam 22. The cam hole 26 includes a lower portion 26A and an upper portion 26B. A pin 28 serving as a front side connecting portion for connecting with the vehicle body is positioned in the cam hole 26 for movement along the cam hole 26.

The pin 28 is positioned at the front end portion of a first link 30 constituting a part of a link mechanism. The rear end portion of the first link 30 is axially supported in a pivoting manner by a shaft 32 serving as a rear side connecting portion for connecting with the vehicle body. The shaft 32 is supported or mounted on the bracket 14. When the cam 22 is rotated in the direction indicated by the arrow A in FIG. 3 with the pin 28 moving at the inside of the lower portion 26A of the cam hole 26, the first link 30 is not pivoted. When the pin 28 moves along the inside of the upper portion 26B of the cam hole 26, the first link 30 rotates in the clockwise direction of FIG. 3 (i.e., in the direction indicated by the arrow C in FIG. 3) along a path centering on the shaft 32. Meanwhile, when the cam 22 is rotated in the direction indicated by the arrow B FIG. 3, the pin 28 moves from the upper portion 26B of the cam hole 26 to the lower portion 26A and returns to the position shown in FIG. 3.

The front end portion 34A of a second link 34 constituting a part of the link mechanism is axially supported in a pivoting manner by the pin 28. The rear end portion 36A of a third link 36 constituting a part of the link mechanism is axially supported for pivoting movement at the rear end portion 34B of the second link 34 by a pin 38. By way of a pin 40, the front end portion 36B of the third link 36 is axially supported for pivoting movement on the rear portion 44A of a bracket 44 that is fixed to the trunk lid 42 thus serving as rear side connecting portion for connecting with the trunk lid. Further, the rear end portion 46A of a fourth link 46 constituting a part of the link mechanism is axially supported for pivoting movement by the pin 40.

A pin 48 serving as a front side connecting portion for connection with the trunk lid is supported at the front end portion 46B of the fourth link 46. The pin 48 is detachably engaged with a hook 52 functioning as a connection releasing mechanism or releasable connection mechanism that is arranged at the front portion 44B of the bracket 44 that is fixed to the trunk lid 42. When the hook 52 is disengaged from the pin 48, the fourth link 46 is able to pivot relative to the trunk lid 42 about the axis of the pin 40 as shown in FIG. 1. On the other hand, when the hook 52 is engaged with the pin 48, the fourth link 46 is unable to pivot relative to the trunk lid 42.

The hook 52 is movable relative to the bracket 44 in a rearward direction (i.e., in the direction of the arrow D in FIG. 3) and a front or forward direction (i.e., the direction indicated by the arrow E in FIG. 3) to effect the engagement and disengagement with the pin 48. The hook 52 is urged in the front or forward direction, that is in the direction of engagement with the pin 48, by the urging force associated with an urging member that, in the illustrated embodiment, is in the form of a helical spring 54. Further, a rear end portion of the hook 52 is connected to a rear portion 22B of the cam 22 by a connecting element which, in the illustrated embodiment, is in the form of a wire 58. When the cam 22 is rotated in the direction indicated by the arrow A in FIG. 3 about the axis of the shaft 24, the wire 58 is moved in the direction indicated by the arrow D in FIG. 3, whereupon the hook 52 is detached from the pin 48. Thus, the cam 22 and the wire 58 form a mechanism for releasing the connection between the hook 52 and the pin 48.

The front end portion 60A of a fifth link 60 constituting a part of the link mechanism is axially supported for pivoting movement by the pin 48. A pin 62 is supported at the rear end portion 60B of the fifth link 60. The rear end portion 64A of a sixth link 64 constituting a part of the link mechanism is axially supported for pivoting movement by the pin 62, and the front end portion 64B of the sixth link 64 is axially supported in a pivotable manner by the shaft 32. Additionally, the middle portion 60C of the fifth link 60 and the middle portion 34C of the second link 34 are connected in a pivoting manner by a pin 66.

The pin 40 and the pin 48 constitute a first connecting portion while the pin 28 and the shaft 32 constitute a second connecting portion.

Referring to FIG. 2, when the rear portion 42A of the trunk lid 42 is manually moved upwardly, the second link 34 is moved or pivoted upwardly in a manner centered on the pin 28. The sixth link 64 is also pivoted or moved upwardly in a manner centered on the shaft 32. As a result, the third link 36 is pivoted relative to the pin 38 and the pin 40, and the fifth link 60 is pivoted relative to the pin 48 and the pin 62 in a manner centered on the pin 66. Accordingly, the trunk lid 42 can be moved to the rear side opened state designated by the two-dotted chain lines in FIG. 2.

When the motor 10 is operated (e.g., by operation of a switch in the vehicle) and rotated in a forward manner to cause the cam 22 to pivot about the axis of the shaft 24 from the stationary position shown by bold lines in FIG. 1 in a direction towards the position shown by the two-dotted chain lines in FIG. 1, the initial stage of pivoting of the cam 22 causes the pin 28 to move inside the lower portion 26A of the cam hole 26. This causes the wire 58 to move in the direction of the arrow D shown in FIG. 1 so that the hook 52 is detached from the pin 48. When the cam 22 is further pivoted about the axis of the shaft 24, the pin 28 is moved inside the upper portion 26B of the cam hole 26. Thus, the front end portion 34A of the second link 34 moves rearwardly along with the pin 28, and the first link 30 is pivoted in a manner centered on the shaft 32 from the stationary position shown by the bold lines in FIG. 1 in the direction towards the position shown by the two-dotted chain lines in FIG. 1. As a result, the third link 36, the fourth link 46, the fifth link 60 and the sixth link 64 are respectively pivoted via the first link 30 and the second link 34. The trunk lid 42 is thus moved to the front side opened state represented by the two-dotted chain lines in FIG. 1.

Figure 4:
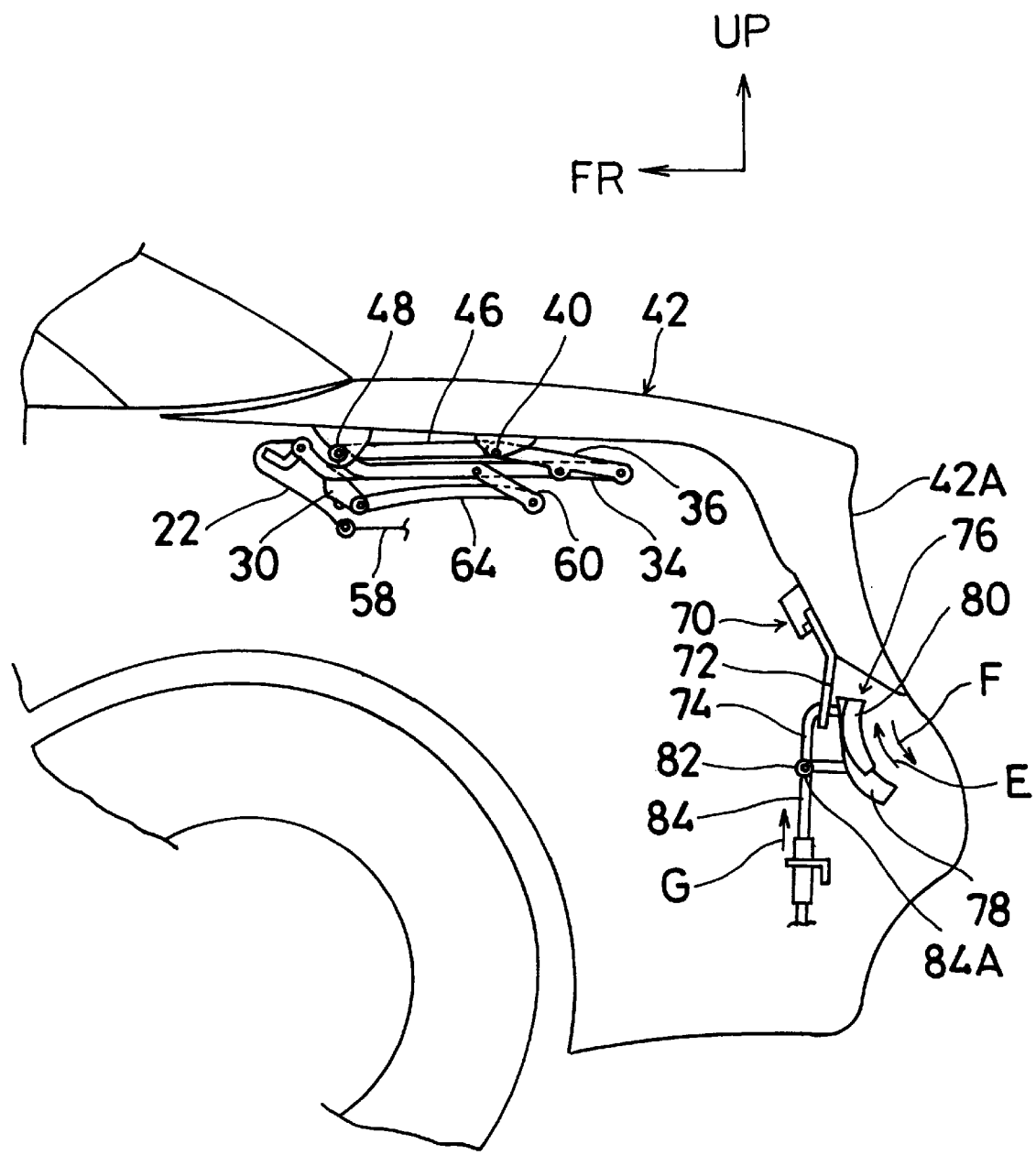
FIG. 4 is a side view of the rear end of the vehicle body at which the opening and closing device according to the present invention is mounted.
Figure 8:
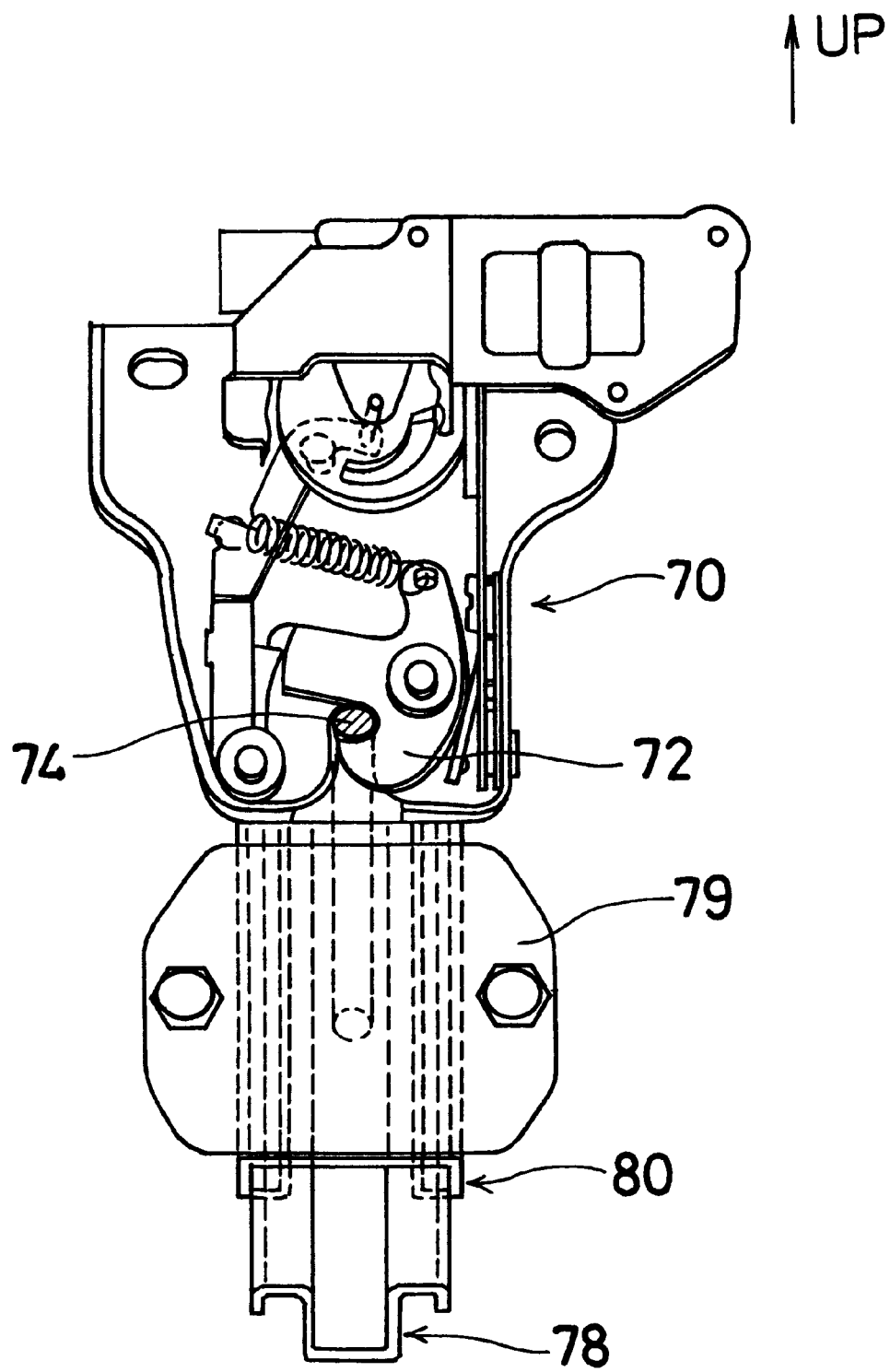
FIG. 8 is a rear view showing a trunk lid lock associated with the hinge portion of the opening and closing device according to the present invention.
Figure 9:
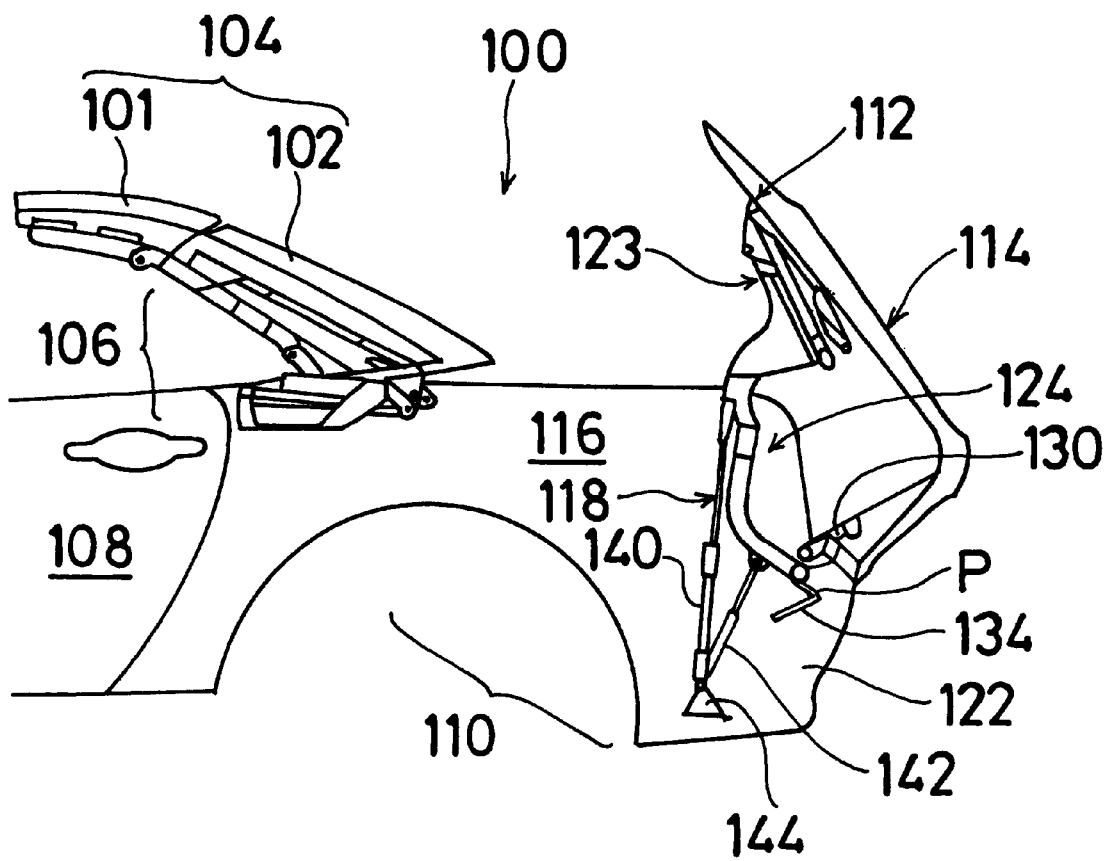
FIG. 9 is a side view of the trunk lid showing a conventional opening and closing device in which the trunk lid is open towards the front side.
Figure 10:
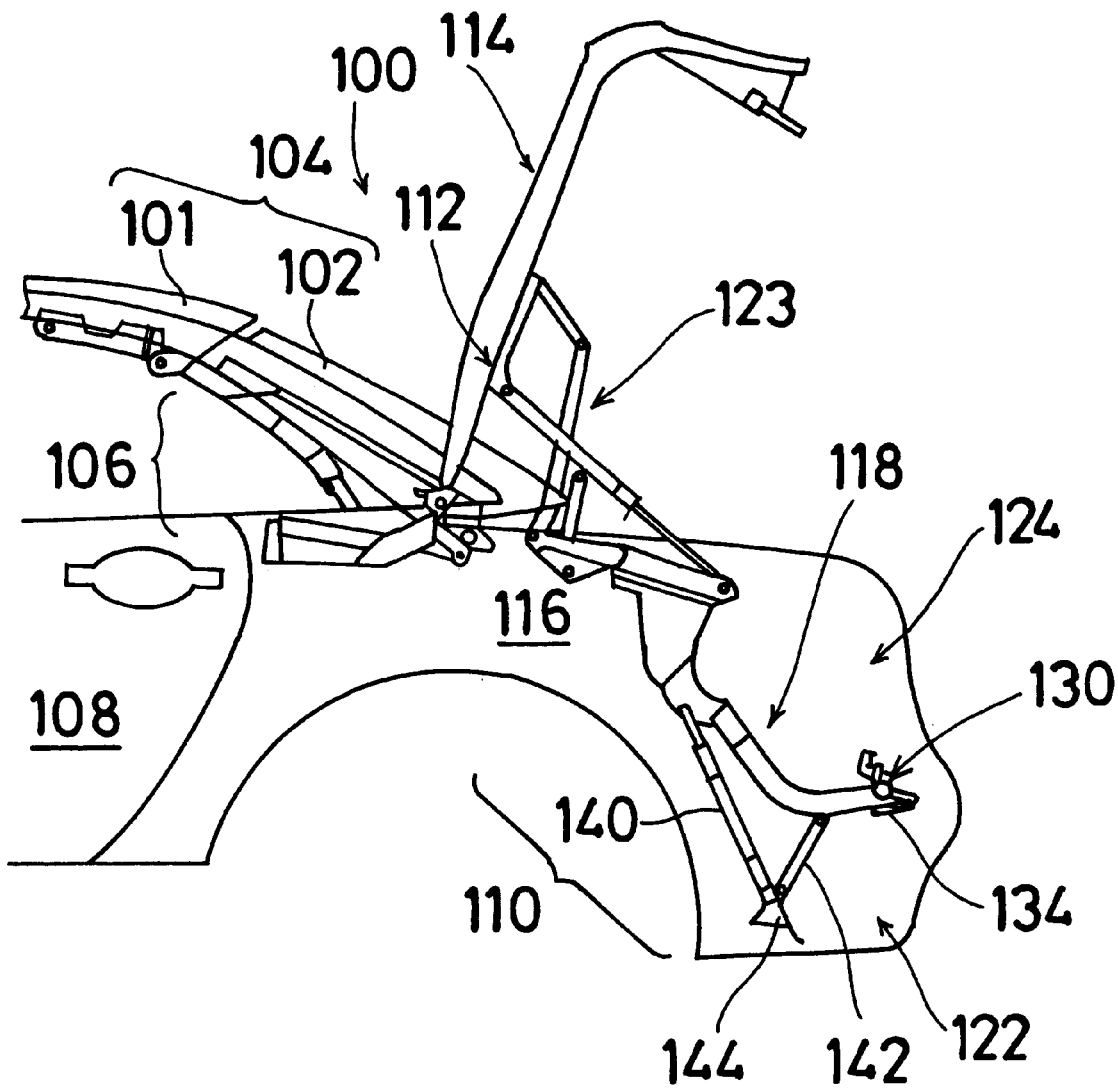
FIG. 10 is a side view similar to FIG. 1, but showing the trunk lid opening towards the rear side.
Figure 11:
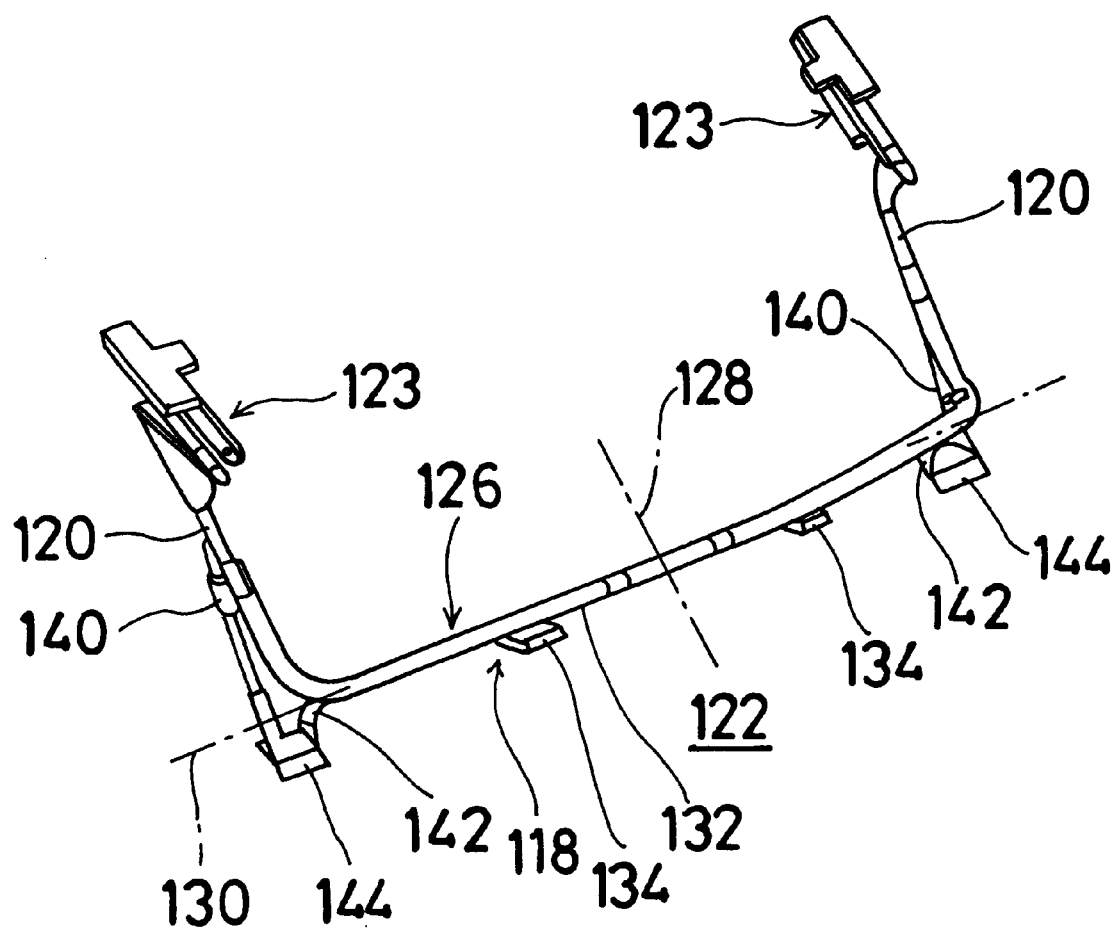
FIG. 11 is a perspective view of the conventional opening and closing device.

As shown in FIG. 4 a trunk lid lock 70 is arranged at the vehicle inner side portion of the rear portion 42A of the trunk lid 42. Also, as shown in FIG. 8, the trunk lid lock 70 is constituted by a well-known mechanism and is installed with a latch 72. The latch 72 is adapted to engage a striker 74 on the vehicle body side.

Figure 5:
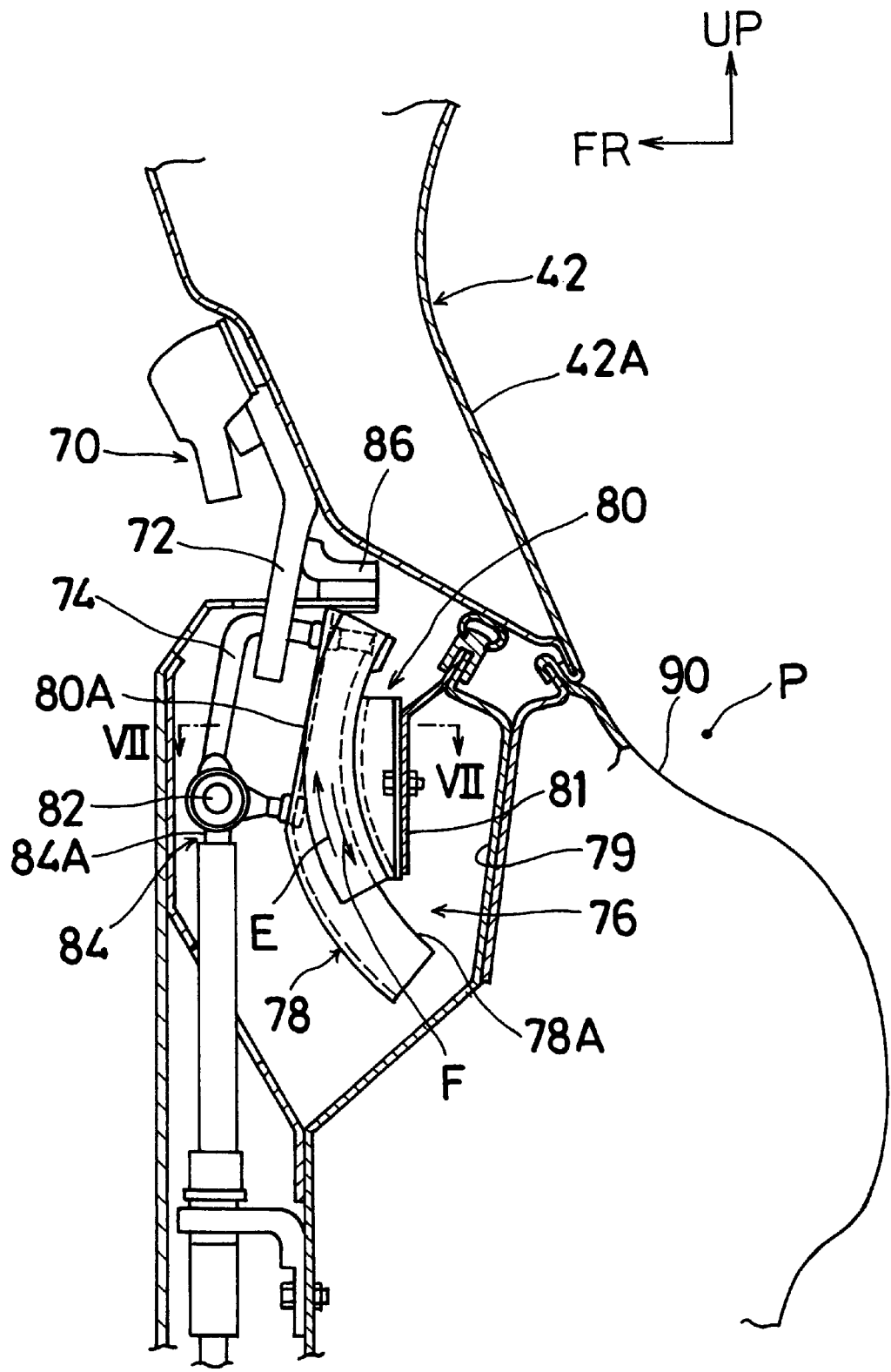
FIG. 5 is an enlarged cross-sectional side view of a portion of the vehicle depicted in FIG. 4 showing the hinge portion of the opening and closing device when the trunk lid is closed.

As seen from FIG. 5, the striker 74 is fixed to a slider 78 of a slide hinge 76 which serves as a hinge mechanism. The slider 78 includes a slide portion 78A which possesses the shape of a circular arc that is curved outwardly towards the front side of the vehicle as seen in side view in the manner depicted in FIGS. 5 and 6.

A skeleton or frame member 79 constituting the rear portion of the vehicle is provided with a guide rail 80 that is fixed in place by way of a bracket 81. A guide portion 80A of the guide rail 80 possesses the shape of a circular arc that is curved outwardly towards the front side of the vehicle as seen in side view. The guide portion 80A is curved in a manner that generally corresponds to the curvature of the slide portion 78A.

Figure 7:
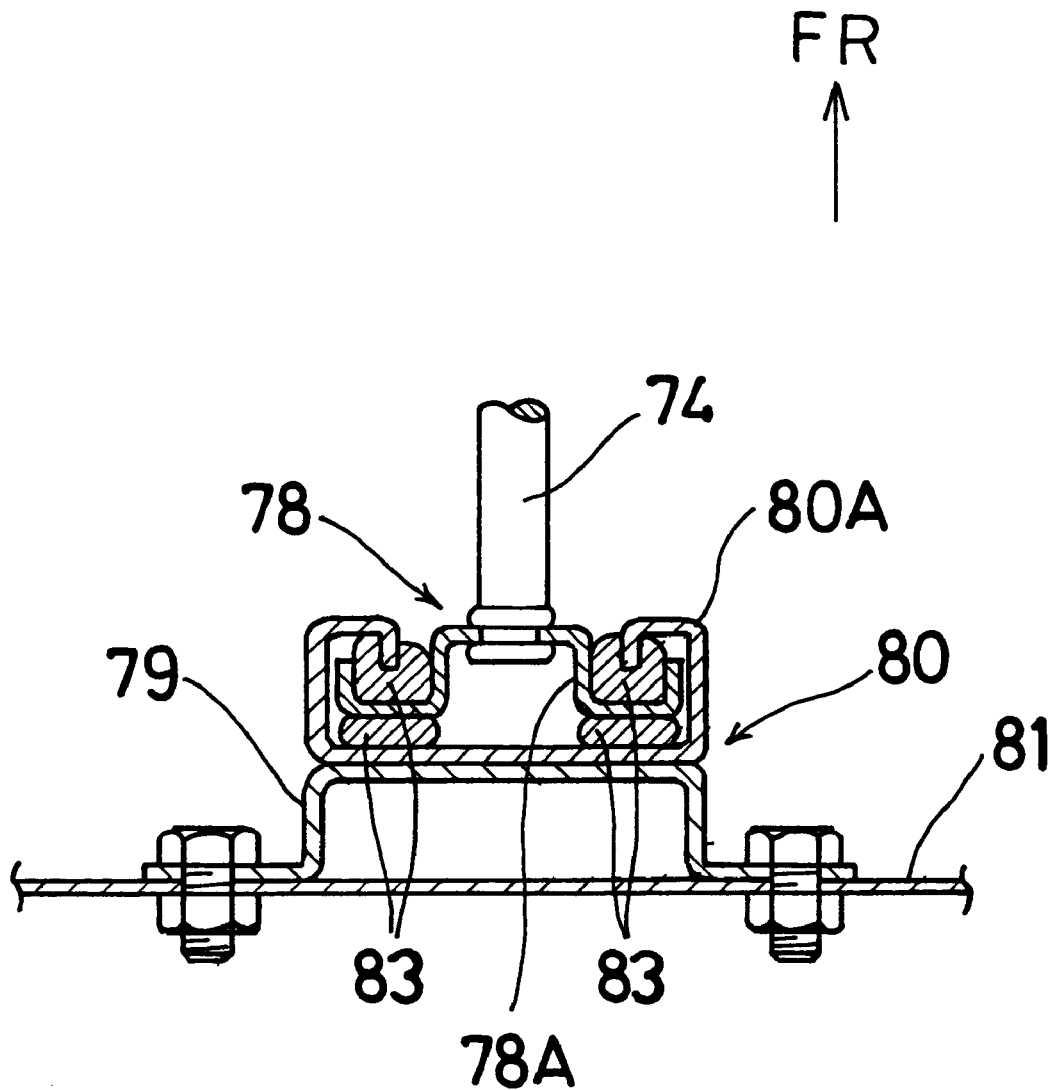
FIG. 7 is an enlarged cross-sectional view taken along the section line VII—VII in FIG. 5.

As shown in FIG. 7. the slide portion 78A of the slider 78 is slidably attached to or mounted on the guide portion 80A of the guide rail 80 via thrust bearings 83. The slider 78 is adapted to be moved along the guide portion 80A of the guide rail 80 in the clockwise direction in FIG. 5 (i.e., in the direction indicated by the arrow E in FIG. 5) and the counterclockwise direction in FIG. 5 (i.e., in the direction indicated by the arrow F in FIG. 5). The rotational center of the slider 78, that is the rotational center of the trunk lid 42, is set at a central position P of the circular arc shape of the guide portion 80A. This central position P is located outside the rear portion 90 of the vehicle body on the rear side of the guide portion 80A of the guide rail 80.

Figure 6:
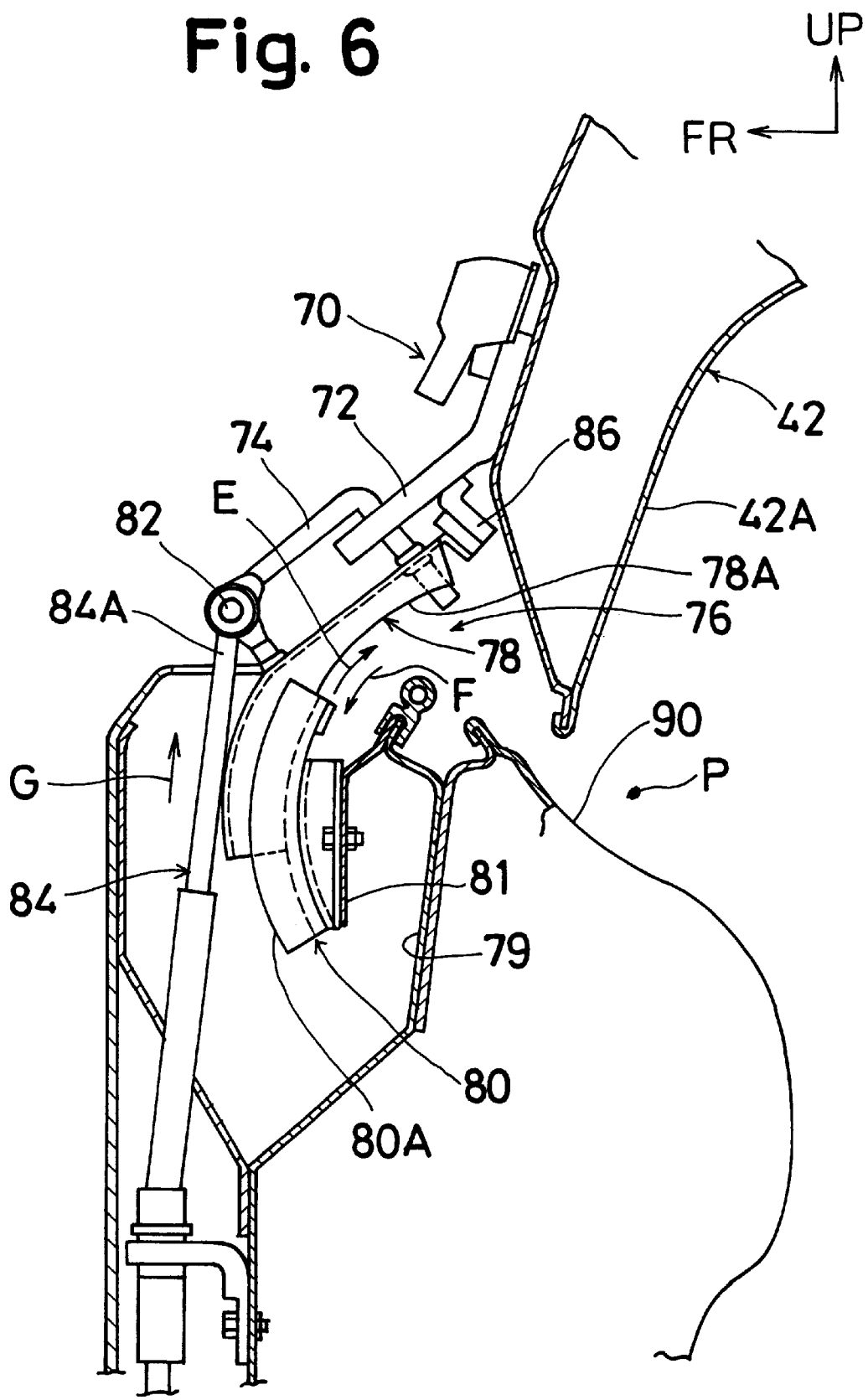
FIG. 6 is a cross-sectional side view of a portion of the vehicle depicted in FIG. 4 showing the hinge portion of the opening and closing device when the trunk lid is opened.

When the trunk lid 42 is brought into the front side opened state as shown in FIG. 6, the latch 72 and the striker 74 move in the direction of the arrow E in FIG. 6 along the guide portion 80A of the guide rail 80 together with the slider 78.

As shown in FIG. 5, one end portion 84A of a connecting mechanism which can be in the form of a wire 84 is connected to the lower portion of the striker 74 by a pin 82. The end portion 84A of the wire 84 is also connected to the first link 30 shown in FIG. 1. Thus, the end portion 84A of the wire 84 is moved upwardly in the direction of the arrow G in FIG. 6 in accordance with rearward pivoting movement of the first link 30 about the axis of the shaft 32. By virtue of this movement of the wire 84, the striker 74 and the latch 72 as well as the slider 78 are also moved in the direction of the arrow E in FIG. 6 along the guide portion 80A of the guide rail 80.

As shown in FIG. 5, a rotation lock 86 is fixed to the upper portion of the slider 78. The rotation lock 86 contacts the latch 72 and prevents the latch 72 from rotating about the axis of the striker 74.

To effect the movement of the trunk lid 42 to the rear side opened state shown in FIG. 2, the engagement between the latch 72 and the striker 74 is released.

Having described the features constituting the trunk lid opening and closing device of the present invention, the operation of the device will now be described. When the front side of the trunk lid 42 is opened, the motor 10 is rotated forwardly. Thus, as seen with reference to FIG. 1, the cam 22 is pivoted about the axis of the shaft 24 from the stationary position shown by bold lines in FIG. 1 in a direction toward the position shown by the two-dotted chain lines in FIG. 1. At the initial stage of pivoting of the cam 22, the pin 28 is moved along the lower portion 26A of the cam hole 26 and so the wire 58 is moved in the direction indicated by the arrow D in FIG. 1. This causes the hook 52 to be released from the pin 48. When the cam 22 is further pivoted in a manner centered on the shaft 24, the pin 28 is moved along the upper portion 26B of the cam hole 26. The front end portion 34A of the second link 34 is thus moved rearwardly along with the pin 28 and the first link 30 is pivoted about the axis of the shaft 32 from the stationary position shown by bold lines in FIG. 1 in the direction towards the position shown by the two-dotted chain lines in FIG. 1. As a result, the third link 36, the fourth link 46, the fifth link 60 and the sixth link 64 are respectively pivoted via the fifth link 30 and the second link 34. The trunk lid 42 is thus brought into the front aide opened state shown by the two-dotted chain lines in FIG. 1. In this state, the forward end of the trunk lid 42 is lifted up or raised.

As a result of the forward rotation of the motor 10, the first link 30 is pivoted rearwardly about the axis of the shaft 32. This pivoting of the first link 30 causes the wire or connecting element 84 shown in FIG. 6 to move upwardly in the direction of the arrow G in FIG. 6. Accordingly, the striker 74 and the latch 72 are moved in the direction of the arrow E in FIG. 6 along the guide portion 80A of the guide rail 80 together with the slider 78. As a result, the trunk lid 42 is moved in a rather smooth manner and is brought into the front side opened state. In this state, the convertible vehicle roof and rear window can be stored in the opening in the trunk.

The trunk lid 42 is returned from the front side opened state to the closed state by reversing the rotating operation of the motor 10, thus causing the respective links to be moved in directions reverse to those in the opening operation described above. By the tension of the wire 84, the striker 74 and the latch 72 are moved in the direction of the arrow F shown in FIG. 6 along the guide portion 80A of the guide rail 80 together with the slider 78. Also, after the trunk lid 42 is brought into the closed state, the wire 58 is moved in a direction opposite the direction indicated by the arrow D in FIG. 1 whereupon the hook 52 engages the pin 48.

As seen with reference to FIG. 3, when the rear side of the trunk lid 42 is opened, the engagement between the latch 72 and the striker 74 is released and so the rear portion 42A of the trunk lid 42 can be manually moved upwardly. At this time, the hook 52 remains engaged with the pin 48 and so the fourth link 46 is in a state where it is fixed to the trunk lid 42 via the front portion 44B and the rear portion 44A of the bracket 44. Further, the cam 22 is also stopped and so the first link 30 is in a state where it is fixed relative to the vehicle body via the cam 22 and the bracket 14. As a result, the second link 34 is moved or pivoted upwardly, centering on the pin 28, and the sixth link 64 is pivoted upwardly about the axis of the shaft 32. Accordingly, the third link 36 is pivoted relative to the pin 38 and the pin 40, and the fifth link 60 is pivoted relative to the pin 48 and the pin 62 about the axis of the pin 66. Accordingly, the trunk lid 42 is brought into the rear side opened state shown by the two-dotted chain lines in FIG. 2. In this state, the rear end of the trunk lid 42 is lifted up or raised and access to the luggage compartment or trunk of the vehicle is possible.

By virtue of the present invention, the front opening and the rear opening of the trunk lid 42 can be carried out by the link mechanisms on either side of the vehicle that each comprise a relatively uncomplicated construction comprised of the first link 30, the second link 34, the third link 36, the fourth link 46, the fifth link 60 and the sixth link 64. Thus, according to the present invention, the number of parts needed to construct the opening and closing device can be reduced.

In addition, at the initial stage of pivoting of the cam 22, when the pin 28 is moved along the inside of the lower portion 26A of the cam hole 26, the wire 58 is moved in the direction indicated by the arrow D in FIG. 1. The hook 52 is thus automatically released from the pin 48 and so the operation for effecting opening of the trunk lid at the front side is facilitated.

Although the present invention has been described in the context of a preferred embodiment, it is to be understood that variations with respect to the various features constituting the present are possible. For example, the above-described embodiment involves the hook 52 being moved in directions along the trunk lid 42 (i.e., the direction indicated by the arrow D in FIG. 1 and the opposite direction). This can be replaced with a construction in which the pin 48 is installed at the bracket 44B, the hook 52 is installed on the link 60, and the hook 52 slides on the link 60 to thereby engage or disengage the hook 52 and the pin 48. Further, a construction may be employed in which the hook 52 and the pin 48 are engaged with each other or disengaged from each other by virtue of pivoting movement of the hook 52.

Further, in the described embodiment, when the cam 22 is rotated in the direction indicated by the arrow A in FIG. 3 about the axis of the shaft 24, the wire 58 is moved in the direction indicated by the arrow D in FIG. 3 and the hook 52 is detached from the pin 48. As an alternative, a drive motor may be used as connection releasing mechanism for detaching the hook 52 from the pin 48, with the drive motor being moved by an electric signal cooperating with the drive motor 10 for opening the front side of the trunk lid.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. An opening and closing device for opening and closing a trunk lid of a vehicle comprising:

a link mechanism adapted to be mounted between the trunk lid and a vehicle body to move the trunk lid between a front side open state and a rear side open state;

a first connecting portion of the link mechanism being adapted to be connected with the trunk lid and having a rear side connecting portion for being pivotally connected to the trunk lid and a front side connecting portion for being pivotally and detachably connected to the trunk lid;

a second connecting portion of the link mechanism being adapted to be connected with the vehicle body and having a rear side connecting portion for being pivotally connected to the vehicle body and a front side connecting portion for being pivotally and movably connected to the vehicle body; and a hinge mechanism adapted to be mounted between a rear side of the trunk lid and the vehicle body such that the rear side of the trunk lid is pivotally and detachably connected to the vehicle body.

2. The opening and closing device according to claim 1, including a connection releasing mechanism for being positioned between the trunk lid and the front side connecting portion of the first connecting portion for releasing a connection between the front side connecting portion of the first connecting portion and the trunk lid only when the trunk lid is being moved to the front side open position.

3. The opening and closing device according to claim 2, including a cam supporting the front side connecting portion of the second connecting portion and pivoting only when moving the trunk lid to the front side open position such that the front side connecting portion of the second connecting portion is moved.

4. The opening and closing device according to claim 3, including a connecting member connected between the connection releasing mechanism and the cam for operating the connection releasing mechanism by pivoting the cam.

5. An opening and closing device mounted in a vehicle for opening and closing a trunk lid of the vehicle comprising:

a link mechanism mounted between the trunk lid and a vehicle body which permits the trunk lid to be moved from a closed state to a front side open state in which a forward end of the trunk lid is lifted and between the closed state and a rear side open state in which a rear end of the trunk lid is lifted, said link mechanism being pivotally connected to the trunk lid at a pin;

a releasable connection mechanism for effecting connecting engagement between a portion of the link mechanism and the trunk lid to prevent pivoting movement of the trunk lid relative to said portion of the link mechanism about said pin and for effecting release of said connecting engagement between said portion of the link mechanism and the trunk lid to permit pivoting movement of the trunk lid relative to said portion of the link mechanism about said pin.

6. The opening and closing device according to claim 5, wherein said pin is a first pin and including a second pin connecting together two links forming a part of said link mechanism, said releasable connection mechanism including a hook provided on said trunk lid to engage said second pin for effecting connecting engagement between said portion of the link mechanism and the trunk lid and to be disengaged from the said second pin for effecting release of the connecting engagement between said portion of the link mechanism and the trunk lid.

7. The opening and closing device according to claim 6, including a spring operatively connected to said hook to urge the hook in a direction of engagement with the second pin.

8. The opening and closing device according to claim 6, wherein said second pin is supported on a bracket that is connected to the trunk lid.

9. The opening and closing device according to claim 5, including a drive motor and a rotatable cam operatively connected to the drive motor, said cam being connected to one of the links of the link mechanism by way of a connecting element that is positioned within a cam hole provided in the cam.

10. The opening and closing device according to claim 9, wherein said cam hole is L-shaped.

11. The opening and closing device according to claim 9, including a connecting device connecting the cam to the releasable connection mechanism so that upon rotation of the cam the releasable connection mechanism releases said connecting engagement between said portion of the link mechanism and the trunk lid.

12. An opening and closing device mounted in a vehicle for opening and closing a trunk lid of the vehicle comprising:

a link mechanism mounted between the trunk lid and a vehicle body which permits the trunk lid to be moved between a closed state and a front side open state in which a forward end of the trunk lid is lifted and between the closed state and a rear side open state in which a rear end of the trunk lid is lifted, said link mechanism being connected to the trunk lid at first and second spaced apart points;

means for releasing the connection between the link mechanism and the trunk lid at the second point when the trunk lid is moved between the closed state and the front side open state while maintaining the connection between the link mechanism and the trunk lid at the second point when the trunk lid is moved between the closed state and the rear side open state.

13. The opening and closing device according to claim 12, wherein said link mechanism is connected to the trunk lid at the second point by an engaging element provided at either said link mechanism or said trunk lid and a pin provided at the other of said link mechanism and said trunk lid, with said engaging element engaging the pin.

14. The opening and closing device according to claim 13, including a spring operatively associated with said engaging element to urge said engaging element into engagement with said pin.

15. The opening and closing device according to claim 13, including a drive motor, said means for releasing the connection including a rotatable cam operatively connected to the drive motor for rotating in response to operation of the motor and a connecting element extending between said cam and said engaging element for urging the engaging element out of engagement with said pin when said cam is rotated in response to operation of the motor.

16. The opening and closing device according to claim 15, wherein said link mechanism includes a plurality of pivotally connected links, said cam being connected to one of the links of the link mechanism by way of a pin that is positioned within a cam hole provided in the cam.

17. The opening and closing device according to claim 16, wherein said cam hole is L-shaped.

* * * * *